Figure 1:
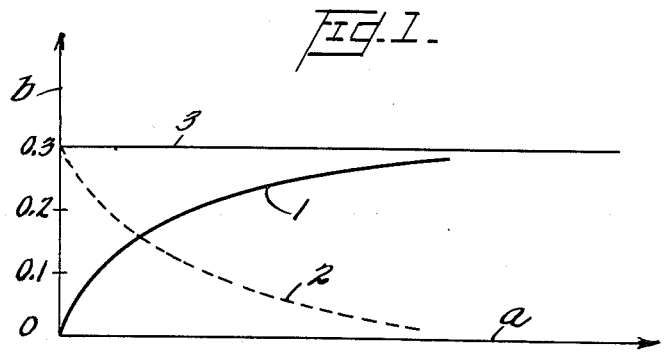

INVENTORS
Pierre E. J. M. Maldague
François Albert DeWaegh

BY Hugo E. Weisberger
ATTORNEY

United States Patent Office 3,222,254
Patented Dec. 7, 1965

3,222,254
METHOD OF CONTROLLING THE REACTIVITY OF A NUCLEAR REACTOR
Pierre Edmond Jules Marie Maldague and Francois Albert de Waegh, Brussels, Belgium, assignors, by mesne assignments, to Société anglo-belge Vulcain, Société anonyme, Brussels, Belgium
Filed Feb. 5, 1963, Ser. No. 256,282
2 Claims. (Cl. 176—22)

The present invention relates to nuclear power reactors in which one or more primary fluids is or are used as a coolant and/or moderator and/or reflector and/or a fluid for regulating the temperature, and travel along one or more circuits of which at least one part passes through the core and/or the reflector.

The present invention consists in a process and in a device for automatically compensating the variations of the poisoning due to xenon 135, by the introduction or removal of one or several neutron-absorbing substances contained in a portion or in the entirety of the said fluid or fluids.

The introduction into the fluids of one or more neutron-absorbing substances can be carried out by all known methods or by a combination of known methods, more particularly by placing them in the form of solutions or suspensions; similarly, the neutron-absorbing substance or substances can be extracted by precipitation and/or centrifugal action and/or distillation and/or demineralization and/or filtration.

If use is made of two or more different neutron-absorbing substances, their introduction as well as their removal can be done either at the same time or at different times.

According to the present invention, the neutron-absorbing substance or substances is or are introduced in a portion or in the whole of the above said fluid or fluids, when the concentration of the xenon 135 becomes lower than its equilibrium value when the reactor is working at full power, the amount of neutron-absorbing substances introduced being such that the total effect of the xenon 135 and of the neutron-absorbing substance or substances on the reactivity shall remain substantially equal always to that due to xenon 135 in equilibrium concentration at full power.

Also, the neutron-absorbing substance or substances is or are removed from a portion or from the whole of the above said fluid or fluids, if the concentration in xenon 135 increases or approaches its equilibrium value. Such removal is also effected in such a manner that the total effect of poisoning (xenon 135+neutron-absorbing substances introduced) shall remain substantially constant.

The introduction and/or the removal of the neutron-absorbing substance or substances is or are effected in a continuous or non-continuous manner by any known means, according as variations of concentrations of xenon 135 take place.

The removal is obtained by applying any known means, (distillation, de-mineralization, precipitation, centrifugation, filtration, etc.) with a constant or variable mass flow derived from the main circuit of the liquids or liquids containing the neutron-absorbing substance or substances. When the said mass flow is constant, owing to the extraction device itself, the concentration in neutron-absorbing substances of the primary fluid or fluids diminishes according to an exponential law, thus allowing practically a compensation to take place of the increase of the exponential formation of the concentration in xenon 135, at the start, of the reactor, or when the power of the reactor is increased.

When a constant mass flow is adopted, its value is chosen in such a manner that the amount of neutron-absorbing substances contained in the main circuit of the above said fluid or fluids, diminishes according to a law such that the total poisoning effect due to xenon 135 and to the neutron-absorbing substance or substances, shall remain substantially constant. Such poisoning effect is shown diagrammatically in FIGURE 1. In FIGURE 1, the abscissae $a$ show the length of time measured from the starting moment or from the moment when an increase of the power of the reactor takes place; the ordinates $b$ show the variation of reactivity associated with xenon and/or with the neutron-absorbing substances above mentioned which have been introduced into fluids passing through the core.

In FIGURE 1, the scale for the ordinate axis is given in arbitrary units and no scale is indicated for the abscissae axis. Absolute units for these scales can be quite easily inferred from published data. The xenon 135 buildup in a power reactor is a well-known phenomenon described in a number of publications. The magnitude of the steady-state poisoning due to xenon 135 is mainly a function of the fissile enrichment and the reactor power. The steady-state xenon 135 poisoning value ranges from 2%$\Delta k$ up to 4.5%$\Delta k$ in the power reactors presently existing (The Physical Theory of Neutron Chain Reactors p. 601—University of Chicago Press 1958). The law of variations of xenon 135 poisoning at reactor startup, as represented in FIGURE 1, depends also on the fissile enrichment and the power of the considered reactor (International Series of Monographs on Nuclear Energy—Galanin—fig. VII page 401—Pergamon Press 1960). The time required to reach 95% of the steady state poisoning starting from a core containing no xenon is usually of the order of 40 hours.

The curves 1 and 2 correspond respectively to the effect produced upon the reactivity of xenon 135 and of the neutron absorbing substance or substances temporarily introduced into the core. The curve 3 shows the total effect of xenon 135 and of the above said neutron-absorbing substances upon the reactivity; the said curve is therefore obtained by addition of the curves 1 and 2. In the example shown in FIGURE 1, the introduction of neutron-absorbing substances is such that the total poisoning effect shall be constant; the curve 3 is a horizontal straight line.

When a constant mass flow has been carried out, the system proposed for the removal works therefore in an entirely automatic manner and does not require any electronic or other regulating device.

The main advantages of the proposed system are the following:

practically negligible variations of the distribution of power inside the core when modifications of the concentration in xenon 135 appear;

the method of extraction is self-regulating and does not require costly and/or cumbersome regulating devices;

the margin of reactivity which is adjustable by other means and is availalbe for the burnup, for Doppler effect, for the temperature effect, etc., is not reduced by the necessity of compensating the xenon effect.

Such advantages are particular to the proposed system, as proved by an analysis of the drawbacks which are associated with the compensation of the xenon effect by the means conventionally used;

when shutoff rods are used, the compensation of the variations of the xenon effect produces variations in the distribution of power (with possible production of hot spots) and demands an increase of the total reactivity which should be overcome by the shutoff rods;

if the xenon effect is compensated by variations of temperature of the moderator or moderators, and/or reflectors and/or coolant, a lowering of the thermodynamic efficiency of the reactor in full power results, as well as a reduction of the margin of reactivity which is available for burnup, by the action of the temperature;

if use is made of a variation of the level of the moderator and/or reflector and/or coolant, variations are produced of the power distribution and also a reduction of the margin of reactivity which is available for the burnup through the effect of the level change.

The spectral shift reactors in which the variations of xenon poisoning are compensated by an increase of the contents, either of heavy water or of light water, inside the primary fluid, have obviously the drawback of requiring, either very important additional reserves of heavy water, or a plant for the concentration of heavy water which is expensive and cumbersome, for the working of the nuclear reactor.

By way of example and non restirictive of the scope of the invention, a description is given hereinafter of the application of the process and device according to the present invention to a reactor of the pressurized water type utilizing a spectral shift.

The essential characteristic features of the said reactor are as follows:

the reactor is moderated, cooled and, if necessary, reflected by means of a mixture of heavy and light water;

the spectral shift is obtained in part or wholly by means of a continuous or non continuous variation of the percentage of light water in the primary fluid;

the nuclear fuel is formed by uranium oxide pellets, the uranium being slightly enriched in $U_{235}$ or in plutonium, piled inside tubes of stainless steel, zirconium or any other-known suitable material;

the variations of reactivity associated with the Doppler effect are compensated by a variation of the average temperature of the coolant, moderator and reflector;

the variations of reactivity associated with the modifications of concentration of xenon 135 are compensated by a variation of the concentration of one or several neutron-absorbing substances introduced into the primary fluid;

the variation of reactivity associated with the consumption of fissile materials and with the accumulation of the fission products is compensated by an increase of the contents of light water inside the primary fluid (moderator, coolant and/or reflector).

Figure 2:
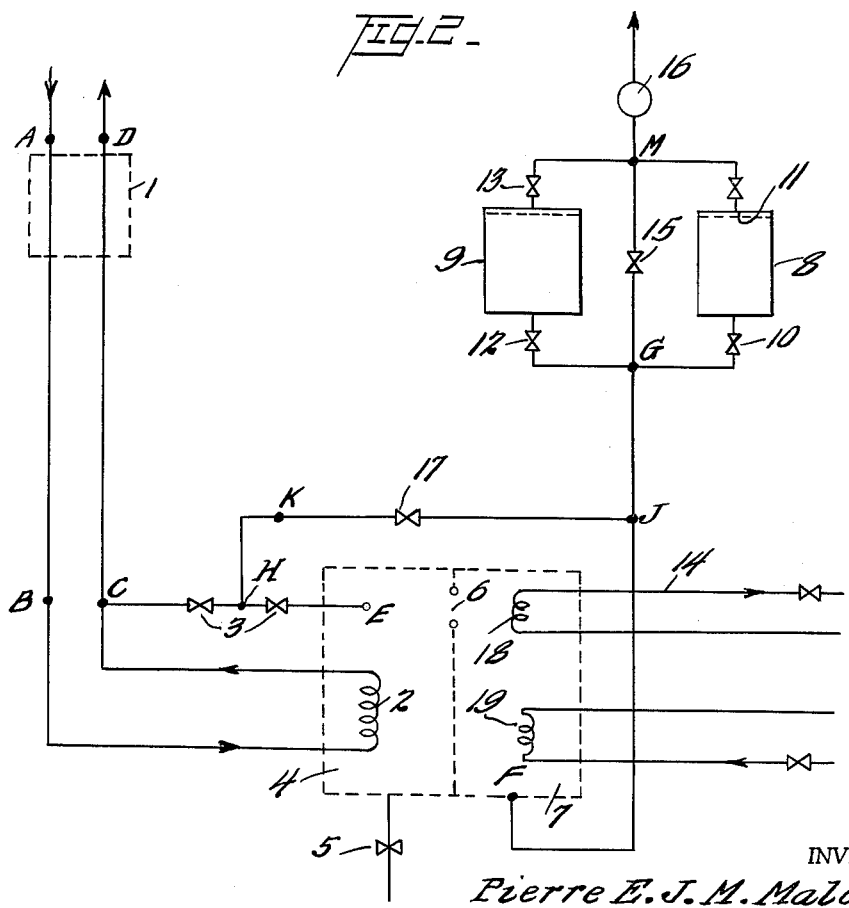

The diagram disclosing the principles of the device for compensating the xenon poisoning according to the present invention is given by way of example and in a nonrestrictive manner in FIGURE 2.

In FIGURE 2, the reference numeral 1 shows a regenerative type of heat-exchanger through the hot leg AB of which a fluid passes, which is derived from the primary circuit; the numeral 2 shows an evaporator which is fed on the primary side by water coming from the hot leg of the regenerative heat exchanger 1, and on the secondary side by water contained in a tank 4, the reference numeral 3 shows two expansion valves adapted to be regulated, or calibrated nozzles through which part of the water branched at the point C passes after the outlet of the primary fluid from the evaporator 2; the numeral 4 shows a tank or vessel in which the water expanded in the valves or nozzles 3 is introduced at E, and in which the said water is evaporated by heat supplied inside the evaporator 2. The reference numeral 5 shows a blow-off system for boric acid and for the sludges assembled at the bottom of the vessel or tank 4. The reference numeral 6 shows an opening for establishing a communication between the upper parts of the vessels 4 and 7. The steam produced at 4 passes into the vessel 7 where it is condensed by the condenser 18 fed on the secondary side by cooling water 14. The condensed water is then cooled by the heat exchanger 19 until a temperature is obtained such that the water may be sent direct to the demineralizing device 9. The reference numeral 8 shows a tank containing crystals of boric acid which bathe in a mixture of heavy and light water saturated in boric acid. The said vessel is controlled up-stream by a valve 10 and on the down-stream by a valve 11. The numeral 9 shows a demineralizer controlled up-stream by a valve 12 and down-stream by a valve 13; the numeral 15 shows a valve placed between the points G and M of the circuit, 16 shows a pump for bringing the fluid of the low pressure circuit into the high pressure primary circuit, 17 is a pressure reducing valve with variable output arranged in the circuit between the points K and J upon the leg HKJ; the numeral 18 shows a condenser placed in the upper part of the tank 6, the numeral 19 shows a heat exchanger arranged in the lower part of the tank 6.

At the first start to power of the reactor, the poisoning effect of xenon 135 is compensated by a continuous or non-continuous increase of the contents of light water in the primary fluid; the injection of light water is stopped when the equilibrium concentration in xenon 135 has been reached, when the reactor is at full power. In the case of a shutdown of the reactor for a period of time somewhat long, such that the poisoning due to xenon shall have disappeared wholly or in part, boron is introduced in the form of a solution of boric acid into the primary circuit. The amount of boron introduced is such that the total poisoning effect of xenon 135 and of boron remains practically unchanged in time and equal to that of xenon 135 in an equilibrium concentration at full power. The boron (in the form of boric acid) is introduced by branching part of the primary fluid through the vessel 8 containing boron crystals which bathe in a mixture of heavy and light water saturated in boric acid. The introduction of boron into the primary fluid is necessary for permitting a restarting of the reactor without the use of shutoff rods. The re-introduction is effected in a continuous or non-continuous manner so that the poisoning effect of boron plus xenon 135, shall practically correspond to that of xenon 135 in an equilibrium concentration at full power. The temperatures of the primary fluid at the inlet and outlet into the core will automatically take their steady state values, without being affected by a variation of the xenon 135 concentration.

When re-starting the reactor, the valves 10 and 11 are closed, the valves 12 and 13 and/or the valve 15 remain open. The water derived from the primary circuit passes through the regenerative heat-exchanger 1, then through the evaporator 2, to which it supplies the heat required for evaporating the water the pressure of which is reduced by the valves, or by the calibrated nozzles 3. By a distillation of the water of the vessel 4, the boron is separated from the steam in the form of boric acid. Such distillation allows also of purifying the water in a practically complete manner. The solid impurities which it contains in solution and in suspension may be periodically extracted through the blow-off cock 5. The steam passes into the vessel 7 inside which it is condensed. The removal of heat required is carried out by a condenser 18 which is fed on the secondary side by means of cooling water. The condensed primary water is cooled by the heat exchanger 19 and is then re-taken at F through the pump 16 and may also pass through the demineralizer 9. It is then re-introduced into the primary circuit.

If variations of the power bring an appreciable modification of the xenon 135 concentration, the method to follow is similar to that described in case of shutdown or of restarting of the reactor. When the power is reduced below its steady state value, boron is introduced in the manner above explained, and so that the total poisoning effect of xenon 135+boron shall be maintained.

The opening and the closing of the valves 10 and 11 for the introduction of boron may be automatically controlled by a thermocouple measuring the temperature of the main coolant at the outlet from the core, an increase or a reduction of that temperature producing respectively an opening or a closing of the valves 10 and 11. In order to avoid an undesired introduction of boron in the case of rapid transients, there may be a rather important delay (20 to 30 minutes) in the actuation of the valves from the thermocouple. During an increase of the power, the boron is automatically extracted in the manner above described.

The thermocouple is preferably located in a position appropriate for measuring the average coolant outlet temperature resulting from mixing of water arising from all channels at the upper surface of the core.

The average coolant outlet temperature is 308.5° C. at full power, under steady state conditions. In that particular case, the valves 10 and 11 are opened when the temperature, measured at the thermocouple hereabove mentioned, rises above 312° C. for a continuous period of time larger than 20 minutes.

The rate of insertion of boric acid is then such as to increase the primary water boric acid content by 20 parts per million per hour.

When the average coolant outlet temperature decreases under 312° C., for a continuous period of time greater than 10 minutes, the valves 10 and 11 are turned off.

When all the boron has been eliminated from the primary circuit, it is possible either to let the system work as above described, or to close the valve 3 arranged in the branch CH and to open the valve with variable output 17, which brings the fluid derived from the primary circuit direct to the point G.

In the example described, the main advantages of the process and device proposed for the compensation of xenon effect by means of boron are the following:

the use of control rods is avoided, such rods worsening the power distribution and requiring a costly and cumbersome electronic apparatus;

by comparison with a compensation of the xenon effect obtained by a variation of the temperature of the primary fluid, the present invention avoids an important lowering of the temperature of the coolant (from 20 to 50° C.), and therefore a lowering of the thermodynamic efficiency of the reactor, when operating at full power the reactor in a steady state;

it is possible to obtain a compensation of the xenon effect which shall be entirely automatic either at the start, or during a rise or a lowering of the power of the reactor;

an important part of the impurities of the primary fluid are removed by distillation, thus allowing of reducing the size of the demineralizer and the frequency of replacement of resins.

By way of example and in a non-restrictive manner, numerical data relating to the application of the device proposed for the reactor above mentioned are given, when the reactor possesses in addition the nominal characteristics which are mentioned hereinafter:

the ratio of the volumes inside the core taken respectively by the total moderator (mixture $D_2O$—$H_2O$) and the fuel ($UO_2$) has a value substantially equal to 4;

the pressure of the primary circuit is 120 kg./cm.$^2$;

the thermal power of the reactor is 65,000 kw.;

the water volume of the complete primary circuit is 3500 litres;

the average temperature of the primary fluid during steady state working of the reactor is 300° C.;

the pressure in the evaporation vessels 4 and condensation vessels 7 is 3.5 kg./cm.$^2$ which corresponds to a temperature of saturation of substantially 140° C.;

the specific power is 52 kw. per kg. of uranium contained as $UO_2$;

the sheathing of fuel elements consists of stainless steel and the enrichment of the uranium is of 7% in weight of $U_{235}$.

In the particular reactor, above described, contents of boron of 65 p.p.m. (that is 400 p.p.m. of boric acid) in the primary fluid inside the core is sufficient for obtaining a poisoning effect equivalent to that produced during steady state working at full power by the xenon 135. Such comparatively small contents of boron are connected with the comparatively high value of the ratio water/$UO_2$ inside the core;

the mass flow derived from the hot leg of the regenerative heat-exchanger is 2850 kg. per hour;

the constant mass flow which passes through the throttle valves 3 is 210 kg./hour;

the temperature drop along the hot leg of the regenerative heat-exchanger is 70° C. (from 300° C. to 230° C.). Inside the evaporator the temperature drop is 30° C. In the cold leg of the regenerative heat-exchangers the temperature of the primary fluid is increased by 80° C.;

the mass flow of water inside the cooling system of the condenser 18 is 2100 kg./hour. The temperature at the inlet of the cooling device in the conduit 14 is 20° C., its outlet temperature is 70° C. The mass flow of water in the cold leg of the exchanger 19 is 700 kg./hour. The temperature of the condensate inside the tank 6 is 50° C. at the point F;

the thermal power absorbed by the evaporator in the proposed system is 120 kw., that is about 0.2% of the total thermal power output of the reactor.

In the case of power variations the xenon 135 steady state poisoning is worth about 2.5% $\Delta k$ at full power; the time required to reach steady state poisoning within 5% is of the order of 20 to 40 hours according to the magnitude of these power variations.

What we claim is:

1. A method of controlling the reactivity of the nuclear reactor having a core through which a water coolant-moderator flows, comprising the steps of: varying light to heavy water ratio to control reactivity variations, modifying during normal power operation of said reactor the concentration of a poison in response to the water temperature to maintain a combined effect upon reactivity of xenon 135 and said poison substantially equal to that of xenon 135 equilibrium poisoning at reactor full power, and providing for the derivation of a massflow from said primary fluid through a separate circuit in which the removal of said poison is carried out by distillation.

2. A method as claimed in claim 1 whereby the said massflow is constant.

References Cited by the Examiner

Schultz: "Control of Nuclear Reactors and Power Plants," Mar. 31, 1958, pages 213–218, 391–393, 398–401, published by McGraw-Hill.

REUBEN EPSTEIN, *Primary Examiner.*

CARL D. QUARFORTH, *Examiner.*